United States Patent [19]
Moyer et al.

[11] 3,783,498
[45] Jan. 8, 1974

[54] METHOD OF CONSTRUCTING A HOLLOW BEAM

[75] Inventors: Harris P. Moyer, Deerfield; Herbert H. Klein, Arlington Heights, both of Ill.

[73] Assignee: Unarco Industries, Inc., Chicago, Ill.

[22] Filed: Apr. 11, 1973

[21] Appl. No.: 349,913

Related U.S. Application Data

[62] Division of Ser. No. 74,046, Sept. 21, 1970, Pat. No. 3,735,547.

[52] U.S. Cl............... 29/471.3, 29/155 C, 29/477, 29/480, 29/482
[51] Int. Cl........................................... B23k 31/02
[58] Field of Search.................. 29/471.1, 471.3, 29/475, 480, 482, 477, 155 R, 155 C

[56] References Cited
UNITED STATES PATENTS
2,074,987  3/1937  Lagerblade..................... 29/477 X
3,234,704  2/1966  Burgess et al..................... 52/731

*Primary Examiner*—Richard B. Lazarus
*Attorney*—Norman Lettvin

[57] ABSTRACT

A hollow steel beam is formed of sheet metal by automated forming machines including a continuous welding operation. To provide sufficient material along the upper and lower surfaces of the beam, to develop the full potential strength of the beam in bending, reinforcing strips are welded to the upper and lower stringer sections of the beam in an automated machine operation.

4 Claims, 6 Drawing Figures

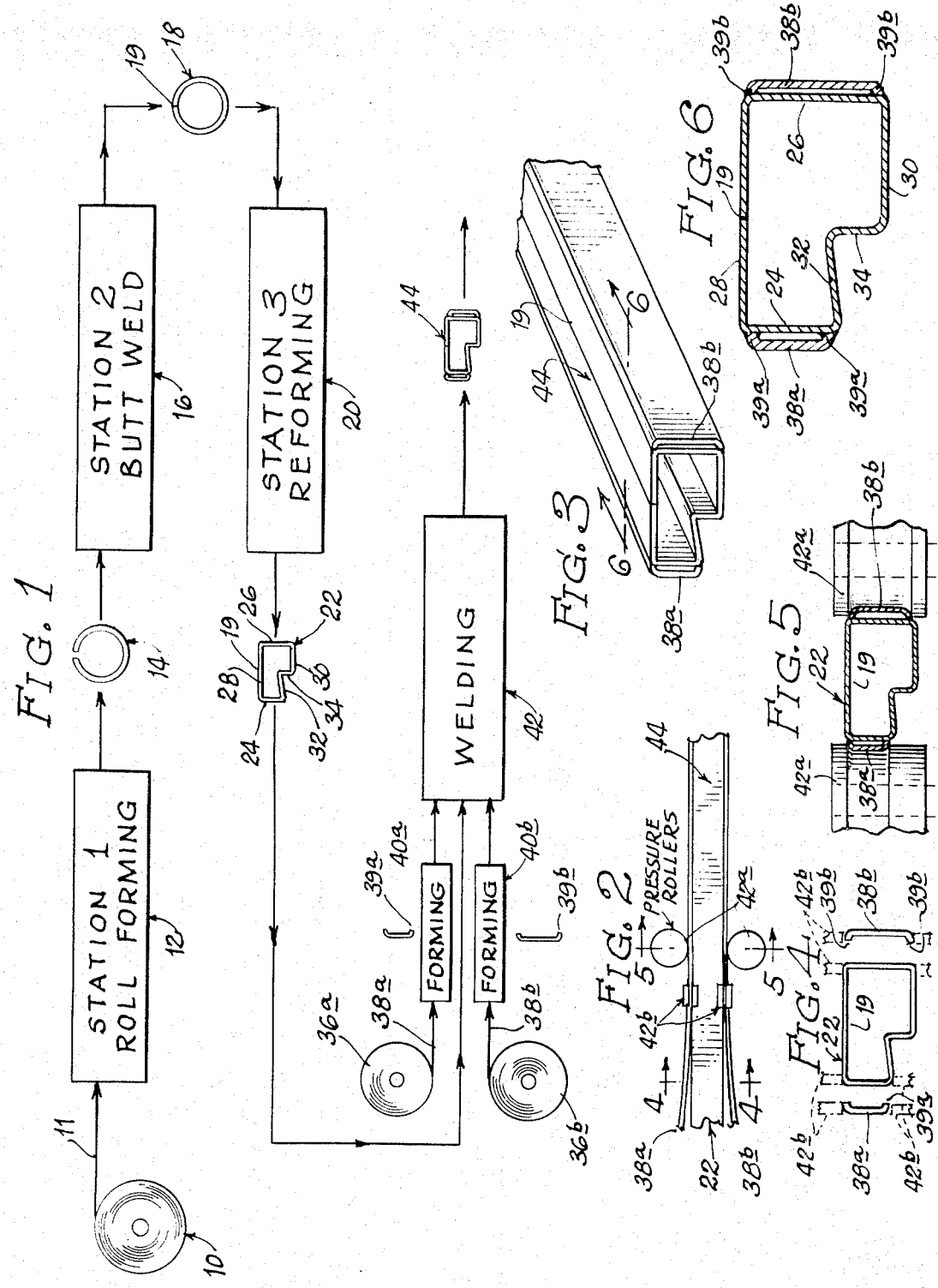

METHOD OF CONSTRUCTING A HOLLOW BEAM

This is a division, of application Ser. No. 74,046, filed Sept. 21, 1970 and now U.S. Pat. No. 3,735,547.

BACKGROUND OF THE INVENTION

This invention relates to an improved hollow steel beam and to an improved method of forming the beam.

It has heretofore been known to form hollow beams by welding together the legs of two channel shaped sections. It has also heretofore been known, in automated processes, to first form sheet steel of very limited thicknesses into tubes which could then be formed by forming machines into hollow beams with some rectangular configuration. However, beams formed of sheet steel of limited thicknesses, while perhaps satisfactory in shear, are not efficient or practical in substantial length, because the thinness of the material severely limits the resistance of the beam to bending stresses. The most economical way that the section modulus of a beam may be built up, or increased to resist bending stresses that occur with beam loadings, is to provide more beam material only at the upper and lower stringer surfaces of the beam. While increasing the thickness of the sheet steel that one starts with might also provide a beam that is satisfactory to resist beam loadings, a beam construction formed entirely of thicker sheet steel would be expensive and uneconomical as the increased thickness of material in the vertical walls of the beam would, in effect, be wasted.

Thus, one object of this invention is to provide a hollow steel member construction that is formed from sheet steel by automated machines and which is provided with a proper section modulus to be both effective as a structural beam to resist bending stresses developed by beam type loadings, and be most economical by avoiding wasting of steel in the vertical walls of the beam.

Another object of this invention is to provide an automated method of constructing hollow steel members with reinforced spaced stringer sections from sheet steel, so as to provide reinforced steel beams formed most economically from sheet steel while being capable of exhibiting the strucutral characteristics demanded of beams.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

BRIEF DESCRIPTION OF THE DRAWING

FIG. 1 is a flow chart illustrating the flow of sheet material and the generalized stations for the machines used in constructing the structural beam of this invention;

FIG. 2 is a fragmentary top plan view illustrating the flow of the formed box-beam of sheet metal of uniform thickness and the reinforcing strips through a machine for welding the strips to the upper and lower stringer sections of the box-beam;

FIG. 3 is a fragmentary perspective view of an end of the finished reinforced box-beam;

FIG. 4 is an illustrative cross-sectional view taken substantially at line 4—4 of FIG. 2 and before the reinforcing strips have been welded to the box-beam;

FIG 5 is an illustrative cross-sectional view taken substantially at line 5—5 of FIG. 2 illustrating the application of the reinforcing strips to the box-beam by automated machinery; and FIG. 6 is an enlarged cross-sectional view through the finished product and is taken substantially at line 6—6 of FIG. 3.

DESCRIPTION OF THE PREFERRED EMBODIMENTS

Referring now to the drawings, FIG. 1 illustrates a roll, or coil, 10 of sheet steel from which steel sheet 11 feeds longitudinally to a station 12 at which is located machinery for rolling or curving the sheet steel, as it moves longitudinally, to a generally circular shape, as indicated at 14. The generally circular form 14 then passes through a station, generally 16, at which the longitudinally free edges of the curved metal form 14 are welded together to define an elongated tube as at 18 with a single longitudinal weld 19 along its length. The details of such machines for forming sheet steel to its generally circular shape and for continuously welding the butt edges together at seam 19 are not shown since such machines are well known in the art. Although the bending and welding are illustrated as occurring at separate stations, this is merely illustrative to show different stages of the process, and it will be understood that a single elongated station may be provided in which the sheet steel 11 is first formed to the cross section 14 and then longitudinally welded at 19 to produce an elongated tube with a cross-section, as illustrated at 18. A typical machine for continuously forming a longitudinally welded tube of sheet steel formed from a strip of sheet steel is available from AMF Thermatool, Inc., a subsidiary of American Machine & Foundry Company of New Rochelle, New York, under the name "THERMATOOL." Such a machine uses a high-frequency, contact-resistance-welding system which locates electrical contacts on opposite side of the exterior surface of the steel at a point just prior to forming of the weld and then pressure rolls engage and force together the material being welded.

After the steel tube 18 has been formed, it passes longitudinally through the next station, generally indicated at 20, at which forming equipment shapes the tube into a generally rectangular box-beam shape, as seen at 22. Again, such forming machines for shaping tubular steel members into the shape as at 22 are well known in the art.

More specifically, the cross sectional shape illustrated at 22 is that of an elongated box-beam of a type well known in the art and commercially available from the Sturdi-Bilt Division of Unarco Industries, Inc. When in use, the box-beam 22 is positioned at an upright attitude so as to provide the following arrangement of elements: an upper stringer surface 24, a lower stringer surface 26, an upright rear wall 28 with the weld 19 located intermediate the edges thereof and with the edges of wall 28 located at the rear edges of stringers 24 and 26, a forward lower wall 30 with its lower edge located at the forward edge of lower stringer 26, a forward upper wall 32 with its upper edge located at the forward edge of upper stringer 24, and a ledge portion 34 located intermediate the stringers 24 and 26 and serving as a support for cross-support members.

In the form illustrated at 22 in FIG. 1, the various elements, or walls, 24–34, of the box beam are of the same thickness since the box beam shape 22 has been formed from a steel sheet 11. As such, the section modulus of the beam's cross-section, as illustrated at 22, has been found to be inefficient as a structural section in developing the potential of the structure in resistance to bending, such as when an elongated beam of the cross-section 22 is loaded as a beam. Accordingly, it is the purpose of this invention to increase the strength of the stringer sections 24 and 26 of the beam by providing additional material thereat, so as to provide a more efficient section that provides additional resistance to bending for a beam having the cross-section illustrated.

The box beam shape 22 now advances longitudinally toward a welding station, generally indicated at 42, accompanied by elongated steel strips of a size and shape selected to be welded to the upper and lower stringer sections 24 and 26 of the box beam. To provide the necessary steel strips, a first coil, or roll, 36a of sheet steel provides a first strip 38a of selected width and thickness, and a second coil 36b of sheet steel provides a second strip 38b of a different width and thickness. The strips 38a and 38b each are initially in flat form, but later are in the form ilustrated in cross-section in FIGS. 1 and 4 with upset and offset longitudinal edges 39a on strip 38a, and with upset and offset longitudinal edges 39b on strip 38b. The forming of the sheet strips 38a and 38b occurs as the strips move longitudinally through forming machines at stations 40a and 40b, again using equipment well known in the art.

Now, as the longitudinally moving box beam with form 22 and the strips 38a and 38b with upset edges move in unison to the welding station 42, all three parts are brought together simulatneously and welded with use of high-frequency, contact-resistance-welding and pressure as are produced by the said THERMATOOL process. contacts FIG. 2 illustrates schematically how the two strips 38a and 38b are aligned and moved in adjacent the spaced longitudinal stringers 24 and 26 of the box-beam section 22, to be forced laterally against such stringers 24 and 26 by pressure rollers 42a located on opposite sides of a production line, so as to effect the application of a continuous weld between the upset portions 39a and 39b with portions of the stringers 24 and 26 adjacent the edges thereof as seen in FIG. 6. Electrical contact 42b are provided upstream, or in advance, of the pressure rollers 42a as is well known in the use of high-frequency, direct contact-resistance-welding, technique used by the "THERMATOOL" system for producing a high-frequency resistance heating of metals for purposes of welding with the use of presurizing squeeze rollers.

In the form of construction illustrated in FIG. 6, the width of the lower stringer 26 is greater than the width of the upper stringer 24. In completed form the upper stringer is a composite formed by strip 38a welded along its entire length to stringer 24 and the lower stringer is a composite formed by strip 39b welded along its entire length to stringer 26. In order to provide for balanced stressing of the said upper and lower composite stringers, the strip 38a is provided with lesser width and greater thickness than strip 38b. By this arrangement, the section modulus may be balanced so that stresses developed in the lower and upper composite stringers of the box beam will be more nearly equal.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A method for forming a reinforced structural beam from sheet steel comprising the steps of forming an elongated sheet of steel into a substantially circular tubular shape and welding together the longitudinal edges of the rolled form to complete a substantially cylindrical tube, forming the cylindrical tube to provide a substantially box-shaped beam of substantially rectangular cross section having spaced parallel surfaces serving as the upper and lower surfaces of the box shape, providing elongated steel strips and welding the edges of said steel strips to the upper and lower surfaces of the box beam to reinforce same.

2. A method as in claim 1 including the step of providing flat steel strip for reinforcing the beam, upsetting the longitudinal edges from the plane of the flat steel strip, pressing the upset longitudinal edges of the steel strip against the surface to be reinforced and welding said upset portions of the strip to the box beam.

3. A method as in claim 2 including the step of arranging the box beam so that its intended upper and lower surfaces are disposed upright, and simultaneously pressing the upset lonigtudinal edges of said steel strips laterally against said intended upper and lower surfaces so that such laterally directed pressures oppose each other.

4. A method as in claim 1 wherein the tubular shape is manipulated through the forming of same into a box-beam shape to locate the longitudinal welded seam of said tube in an upright side wall of the box-beam and spaced from the intended upper and lower surfaces of said box beam.

* * * * *